US010144316B2

(12) United States Patent
Peterson et al.

(10) Patent No.: US 10,144,316 B2
(45) Date of Patent: *Dec. 4, 2018

(54) SEAT MODULES FOR A MINING VEHICLE

(71) Applicant: Joy MM Delaware, Inc., Wilmington, DE (US)

(72) Inventors: Adam S. Peterson, Franklin, PA (US); Douglas F. Anderson, Cochranton, PA (US); Terry M. Thomas, Franklin, PA (US); Darin M. Sutton, Guys Mills, PA (US); Randy Arnold, Price, UT (US)

(73) Assignee: Joy Global Underground Mining LLC, Warrendale, PA (US)

( * ) Notice: Subject to any disclaimer, the term of this patent is extended or adjusted under 35 U.S.C. 154(b) by 256 days.

This patent is subject to a terminal disclaimer.

(21) Appl. No.: 14/617,407

(22) Filed: Feb. 9, 2015

(65) Prior Publication Data

US 2015/0151655 A1 Jun. 4, 2015

Related U.S. Application Data

(63) Continuation of application No. 13/037,878, filed on Mar. 1, 2011, now Pat. No. 8,985,263.

(51) Int. Cl.
*B60N 2/38* (2006.01)
*B60N 2/75* (2018.01)
(Continued)

(52) U.S. Cl.
CPC ............ *B60N 2/38* (2013.01); *B60N 2/14* (2013.01); *B60N 2/24* (2013.01); *B60N 2/4242* (2013.01);
(Continued)

(58) Field of Classification Search
CPC ......... E21F 13/025; B60N 2/14; B60N 2/143; B60N 2/24; B60N 2/4693; B60N 2/38;
(Continued)

(56) References Cited

U.S. PATENT DOCUMENTS 3,522,839 A 8/1970 Wendt et al.
3,776,358 A 12/1973 Williams
(Continued)

FOREIGN PATENT DOCUMENTS

AU 2007202415 5/2008
AU 2006243875 6/2008
(Continued)

OTHER PUBLICATIONS

Buschsbaum, "Foresignt Energy Invests in Illinois: The Cline Group constructs four underground coal mining complexes," Coal Age, Dec. 2010, pp. 36-53.
(Continued)

*Primary Examiner* — Paul N Dickson
*Assistant Examiner* — Timothy Wilhelm
(74) *Attorney, Agent, or Firm* — Michael Best & Friedrich LLP

(57) ABSTRACT

A mining shuttle car that trams on underground roadways includes a conveyor system and an operator's compartment adjacent to the conveyor system. The operator's compartment includes a rotatable seat and a control station. The operator's seat module is coupled to one or more joysticks that control the car, and the operator's seat module and the control station are mounted on a rotatable platform so as to be rotatable as a unit between a plurality of secured positions for operating the mining shuttle car. Forward movement of the joystick control relative to the seat steers the shuttle car about a point in front of the seat, and rearward movement of the joystick control relative to the seat steers the shuttle car about a point behind the seat. Forward and rearward movement of one of the joysticks steers the mining shuttle car in the same manner regardless of the rotational position of the rotational position of the seat.

17 Claims, 10 Drawing Sheets

(51) Int. Cl.
*E21F 13/02* (2006.01)
*B60N 2/42* (2006.01)
*B60N 2/427* (2006.01)
*B60N 2/14* (2006.01)
*B60N 2/24* (2006.01)

(52) U.S. Cl.
CPC ..... *B60N 2/42736* (2013.01); *B60N 2/42772* (2013.01); *B60N 2/797* (2018.02); *E21F 13/025* (2013.01)

(58) Field of Classification Search
CPC .............. B60N 2/4242; B60N 2/42736; B60N 2/42772; B62D 1/12
See application file for complete search history.

(56) References Cited

U.S. PATENT DOCUMENTS

| | | | |
|---|---|---|---|
| 3,868,896 | A | 3/1975 | Doll et al. |
| 3,983,715 | A | 10/1976 | Hair, Jr. et al. |
| 4,068,728 | A | 1/1978 | Subrick |
| 4,120,527 | A | 10/1978 | Lawrence |
| 4,278,144 | A | 7/1981 | Perin |
| 4,294,082 | A | 10/1981 | Gerboth et al. |
| 4,344,356 | A | 8/1982 | Casterton et al. |
| 4,467,706 | A | 8/1984 | Batcheller et al. |
| 4,480,867 | A | 11/1984 | Ezell et al. |
| 4,492,151 | A | 1/1985 | Mattei |
| 4,612,975 | A | 9/1986 | Ikari |
| 4,616,725 | A | 10/1986 | McDaniel |
| 4,771,855 | A | 9/1988 | Takashima et al. |
| 4,846,529 | A | 7/1989 | Tulley |
| 5,275,255 | A | 1/1994 | Huntley et al. |
| 5,308,279 | A | 5/1994 | Grinberg |
| 5,318,100 | A | 6/1994 | Aoki |
| 5,799,746 | A | 9/1998 | Kortelainen et al. |
| 5,826,440 | A | 10/1998 | Okada et al. |
| 5,890,764 | A | 4/1999 | Lee |
| 5,992,156 | A | 11/1999 | Isobe et al. |
| 6,012,295 | A | 1/2000 | Isobe et al. |
| H001831 | H * | 2/2000 | Kelley .................. B60N 2/4633 180/333 |
| 6,022,182 | A | 2/2000 | Everett |
| 6,039,141 | A | 3/2000 | Denny |
| 6,095,263 | A | 8/2000 | Saunders et al. |
| 6,186,573 | B1 | 2/2001 | Thurab |
| 6,196,308 | B1 | 3/2001 | Halligan |
| 6,220,656 | B1 | 4/2001 | Martin, Jr. |
| 6,446,738 | B1 | 9/2002 | Boyd |
| 6,543,848 | B1 | 4/2003 | Suga et al. |
| 6,557,919 | B2 | 5/2003 | Suga et al. |
| 6,572,172 | B1 | 6/2003 | Ninomiya et al. |
| 6,578,854 | B2 | 6/2003 | Wucherpfennig et al. |
| 6,629,572 | B2 | 10/2003 | Womer et al. |
| 6,684,969 | B1 | 2/2004 | Flowers et al. |
| 6,688,682 | B2 | 2/2004 | Arthur et al. |
| 6,729,031 | B2 | 5/2004 | McKee |
| 6,755,270 | B2 | 6/2004 | Saarinen |
| 6,955,009 | B2 | 10/2005 | Rasmussen |
| 6,955,239 | B2 | 10/2005 | Ueda et al. |
| 6,981,746 | B2 | 1/2006 | Chung et al. |
| 7,036,883 | B1 | 5/2006 | Thompson et al. |
| 7,059,680 | B2 | 6/2006 | Billger et al. |
| 7,069,736 | B2 | 7/2006 | Kamimae et al. |
| 7,083,019 | B2 | 8/2006 | Chiou et al. |
| 7,086,241 | B2 | 8/2006 | Holt |
| 7,159,687 | B2 | 1/2007 | Dunn et al. |
| 7,243,982 | B2 | 7/2007 | Kelley et al. |
| 7,294,181 | B1 | 11/2007 | Smith |
| 7,347,299 | B2 | 3/2008 | Billger et al. |
| 7,434,863 | B2 | 10/2008 | Hamazaki et al. |
| 7,520,567 | B2 | 4/2009 | Billger et al. |
| 7,575,276 | B1 | 8/2009 | Henry |
| 7,607,722 | B2 | 10/2009 | Frett et al. |
| 7,681,630 | B2 | 3/2010 | Klassen et al. |
| 8,056,617 | B2 | 11/2011 | Klassen et al. |
| 2003/0070900 | A1 | 4/2003 | Elwell |
| 2003/0205421 | A1 | 11/2003 | Allen et al. |
| 2003/0230447 | A1* | 12/2003 | Wulfert .................. B60N 2/143 180/329 |
| 2006/0061122 | A1* | 3/2006 | Billger .................. B60N 2/002 296/65.07 |
| 2006/0144634 | A1 | 7/2006 | Portscheller et al. |
| 2007/0145759 | A1 | 6/2007 | Crawford et al. |
| 2009/0218327 | A1 | 9/2009 | Beeson |
| 2009/0276122 | A1 | 11/2009 | Demong et al. |
| 2010/0126188 | A1 | 5/2010 | Clarke |
| 2010/0300796 | A1* | 12/2010 | Ryan .................. B60K 26/00 180/329 |
| 2012/0068478 | A1 | 3/2012 | Nania |
| 2012/0204589 | A1 | 8/2012 | Krellner et al. |
| 2012/0224941 | A1 | 9/2012 | Peterson et al. |
| 2013/0004273 | A1 | 1/2013 | Webb |
| 2013/0140092 | A1 | 6/2013 | Warr |

FOREIGN PATENT DOCUMENTS

| | | |
|---|---|---|
| AU | 2007216811 | 4/2009 |
| CN | 2665073 Y | 12/2004 |
| CN | 101287395 A | 10/2008 |
| DE | 9204392 | 5/1992 |
| DE | 102006018537 | 11/2007 |
| EP | 1288044 A2 | 3/2003 |
| EP | 1669225 | 6/2006 |
| GB | 1022623 | 3/1966 |
| GB | 1126449 | 3/1966 |
| JP | 2006232010 | 9/2006 |
| JP | 2010215143 | 9/2010 |
| PL | 141849 | 7/1987 |
| PL | 174838 | 9/1998 |
| RU | 2338147 C1 | 11/2008 |
| WO | 2009050747 | 4/2009 |
| WO | 2009136005 A1 | 11/2009 |

OTHER PUBLICATIONS

First Patent Examination Report from the Intellectual Property Office of Australia for Application No. 2012200739 dated Mar. 19, 2014 (4 pages).
First Patent Examination Report from the Intellectual Property Office of Australia for Application No. 2012258458 dated Oct. 10, 2013 (3 pages).
Office Action from the United States Patent and Trademark Office for U.S. Appl. No. 13/369,622 dated Jun. 10, 2014 (7 pages).
Office Action from the United States Patent and Trademark Office for U.S. Appl. No. 13/691,920 dated Jan. 2, 2014 (14 pages).
PCT/International Preliminary Report on Patentability and Written Opinion dated Sep. 12, 2013 (9 pages).
PCT/US11/26646 International Search Report and Written Opinion dated Apr. 13, 2011 (13 pages).
Search Report from the Patent Office of the Republic of Poland for Application No. P-398070 dated May 9, 2012 (2 pages).
Search Report from the United Kingdom Intellectual Property Office for Application No. 1202267.9 dated Jun. 27, 2012 (4 pages).
Second Patent Examination Report from the Intellectual Property Office of Australia for Application No. 2012258458 dated Apr. 28, 2014 (4 pages).
1st Office Action from the State Intellectual Property Office of the People's Republic of China for Application No. 201180070416.5 dated Jul. 28, 2015 with English translation (22 pages).
2nd Office Action with English translation from The State Intellectual Property Office of the People's Republic of China for Application No. 201180070416.5 dated Mar. 21, 2016 (15 pages).
Examination Report No. 1 from the Australian Intellectual Property Office for Application No. 2011360963 dated Nov. 12, 2015 (3 pages).
Third Office Action with English translation from the State Intellectual Property Office of the People's Republic of China for Application No. 201180070416.5 dated Sep. 9, 2016 (8 pages).

(56) References Cited

OTHER PUBLICATIONS

4th Office Action with English translation from the State Intellectual Property Office of the People's Republic of China for Application No. 201180070416.5 dated Feb. 20, 2017 (16 pages).
Examination Report No. 1 from the Australian Intellectual Property Office for Application No. 2016250328 dated Jan. 10, 2018 (6 pages).

* cited by examiner

SEAT MODULES FOR A MINING VEHICLE

BACKGROUND

It is common in underground mining to use shuttle cars that tram on underground roadways. The underground roadways are typically limited in width, and there can be insufficient space for the shuttle cars to turn around. Thus, the shuttle cars tram forward when proceeding in one direction along a roadway, and rearward when proceeding in the opposite direction along the road. The role of the shuttle cars is to efficiently remove the cut material from the working face. To this end, a shuttle car typically employs a heavy-duty, high-power drive train that enables it to haul loads in arduous conditions.

SUMMARY

In some embodiments, a seat module is provided for a mining shuttle car that includes a loading end, a discharge end, and a conveyor extending between the loading end and the discharge end. The seat module includes an enclosure, a rotatable platform positioned within the enclosure, and a seat supported by the rotatable platform and rotatable therewith between a first secured position facing generally toward the loading end, a second secured position facing generally toward the discharge end, and at least one secured position between the first and second positions.

In other embodiments, a mining shuttle car includes a loading end, a discharge end, and a conveyor system extending between the loading end and the discharge end. A seat module is positioned adjacent the conveyor system and includes a rotatable seat. The seat is rotatable between a first secured position facing generally toward the loading end, a second secured position facing generally toward the discharge end, and at least one secured position between the first and second positions.

In still other embodiments, a method of operating a mining shuttle car is provided and includes rotating a seat to any one of a plurality of secured positions, tramming in a first direction and pushing a joystick control away from the seat to turn left and pulling the joystick control toward the seat to turn right, and tramming in a second direction opposite the first direction and pushing the joystick control away from the seat to turn right and pulling the joystick control toward the seat to turn left.

In still further embodiments, a mining shuttle car includes a loading end, a discharge end, and a conveyor system extending between the loading end and the discharge end. A seat module is positioned adjacent the conveyor system and includes a seat facing generally toward the conveyor system. The seat includes a joystick control coupled to the seat and operable to steer the mining shuttle car. The mining shuttle car is configured such that forward movement of the joystick control relative to the seat steers the shuttle car about a point in front of the seat, and rearward movement of the joystick control relative to the seat steers the shuttle car about a point behind the seat.

It should be understood that the invention is not limited in its application to the details of construction and the arrangements of the components set forth in the following description or illustrated in the above-described drawings. The invention is capable of other embodiments and of being practiced or being carried out in various ways. Also, it is to be understood that the phraseology and terminology used herein is for the purpose of description and should not be regarded as limiting.

DETAILED DESCRIPTION

Figure 1:
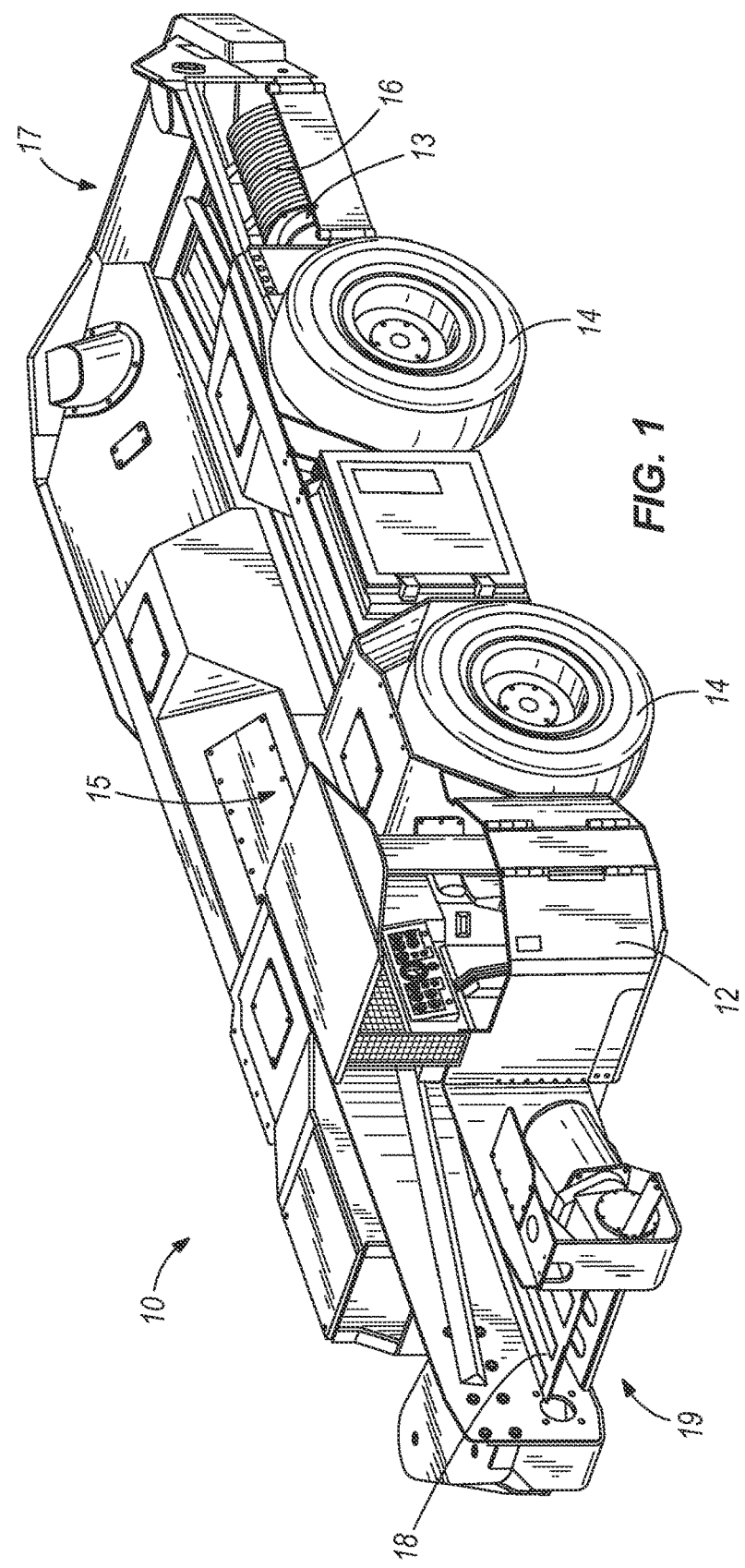
FIG. 1 is a perspective view of a mining shuttle car that includes an operator's compartment.

FIG. 1 is a perspective view of a mining shuttle car 10 generally of the type used for maneuvering in underground roadways during mining operations. The mining shuttle car 10 includes an operator's compartment or cab 12 and a plurality of wheels 14 that support the shuttle car 10 on a roadway surface. A cable reel 13 reels in and pays out cable that connects to nearby plug-in stations along the underground roadway and supplies power to the shuttle car 10. The shuttle car 10 defines a loading end 17 where the mined material is loaded, and a discharge end 19 where the material is discharged. A central channel 15 includes a conveyor system 18 that extends between the loading and discharge ends 17, 19. In the illustrated construction, the operator's compartment 12 is positioned adjacent to the conveyor system 18 near the discharge end 19 of the shuttle car 10.

In underground mining, the shuttle car 10 is powered through the cable 16 and moves or "trams" forwardly and rearwardly along the roadway. During typical operation, the operator maneuvers the car 10 such that the loading end 17 is positioned proximate a working face of the mine, where mined material can be loaded onto the conveyor system 18. Once sufficient material has been loaded, the operator maneuvers shuttle car 10 away from the working face to another location, where the loaded material can be discharged via the conveyor system 18. Because underground roadways frequently are very narrow, the shuttle car 10 is designed so that it need not turn around. Material can be loaded and/or discharged from either the loading end 17 or the discharge end 19, and the shuttle car 10 can tram in either direction.

Figure 2:
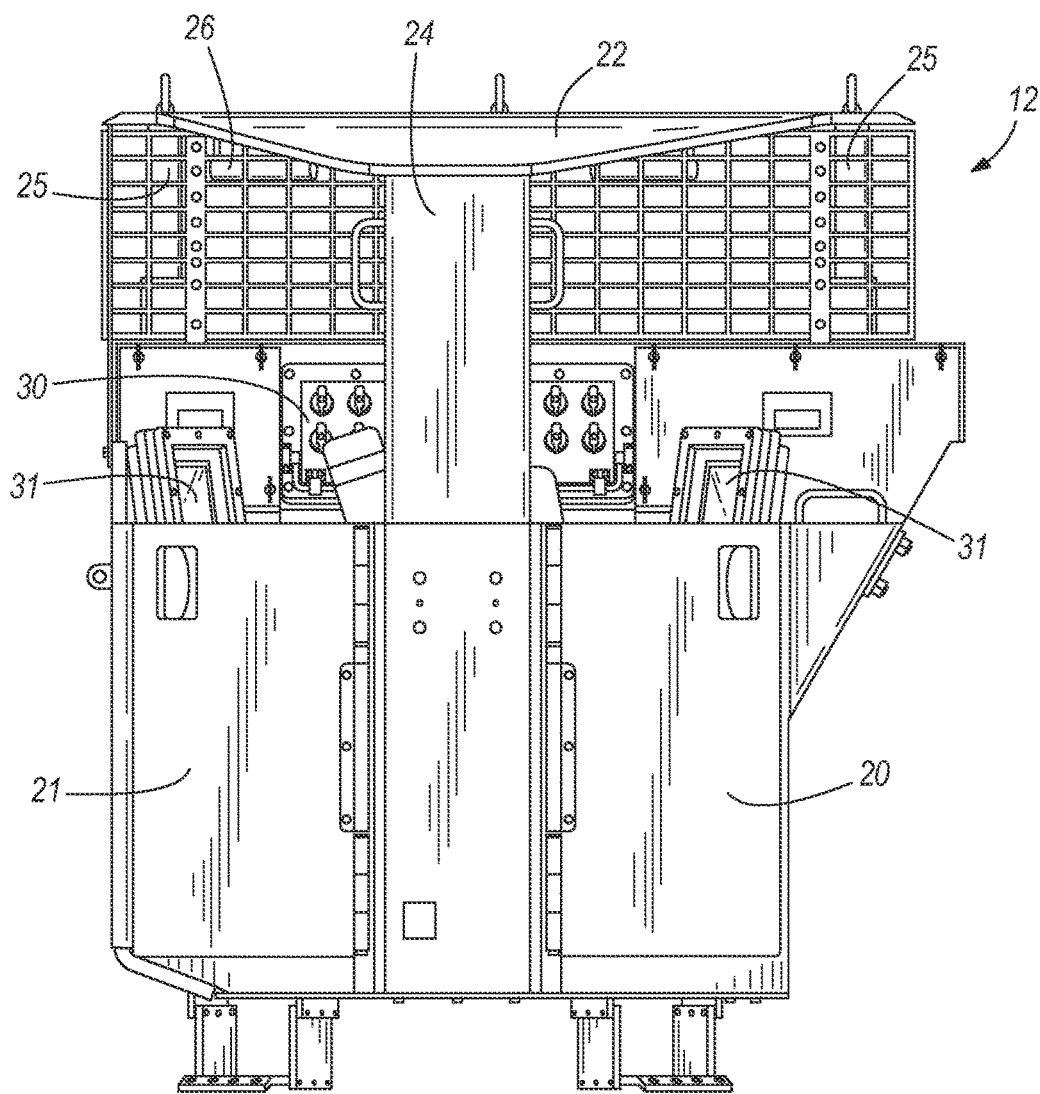
FIG. 2 is a side view of the operator's compartment of FIG. 1.
Figure 3:
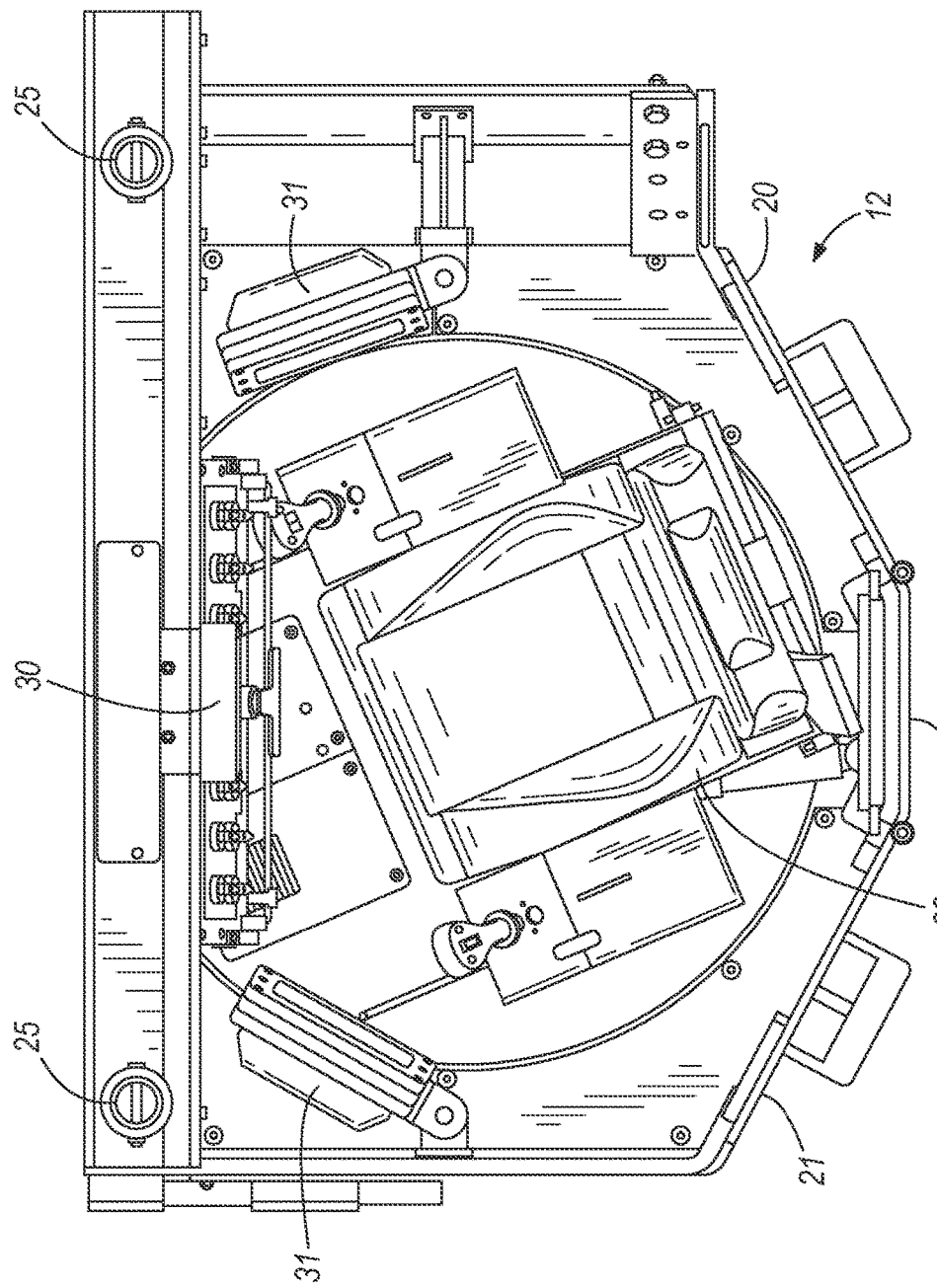
FIG. 3 is a top view of the operator's compartment of FIG. 1 with a canopy removed.

With reference also to FIGS. 2-3, in one embodiment, the operator's compartment 12 defines an enclosure that can be entered through either of two angled doors 20, 21. The door 20 generally faces toward the loading end 17 and the door 21 generally faces toward the discharge end 19. Both doors can be hinged on upright 24. The use of two angled doors 20, 21 can allow an operator to enter or exit the cab 12 in either direction or from any seated position. Other embodiments may include a single door or more than two doors.

The operator's compartment 12 can further include a canopy 22 supported by the upright 24 and a pair of support posts 25. In some embodiments, the posts 25 are mounted to a side of the shuttle car 10, and the upright 24 mounted to an outside wall of the operator's compartment 12. In some embodiments the height of the canopy 22 can be adjusted to allow the operator additional headroom. One or more flexible handles 26 can be disposed on the canopy 22. The operator's compartment 12 also includes a rotatable operator's seat module 28, described further below, a control station 30, and video monitors 31. In some embodiments, the operator's compartment 12 can be pre-assembled as a unit. In this way, the operator's compartment 12 can be installed onto new shuttle cars 10 at final assembly, or retrofitted to shuttle cars.

Figure 4:
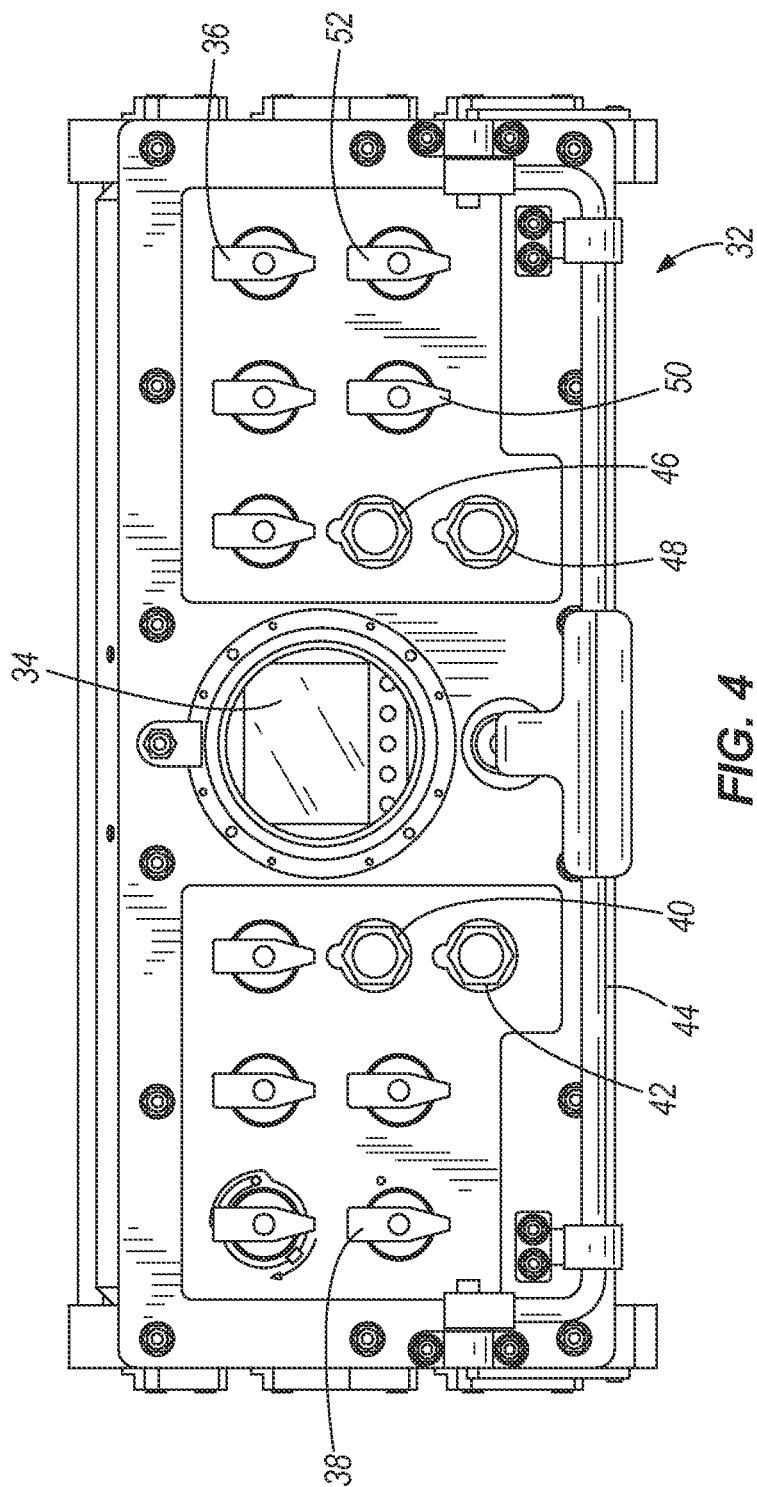
FIG. 4 is a plan view of a control station in the operator's compartment of FIG. 1.

Referring to FIG. 4, the control station 30 can accommodate controls 32 and a diagnostics display 34. For example, the controls 32 in some embodiments can include one or more of the following: a head-light switch 36 to turn head lights on or off or turn the head lights on automatically when needed, an earth-leak test button 38, a button 40 to go back on the diagnostics display menu or reset the display, a button 42 to select a diagnostics display menu or reset the display, an emergency stop bar 44, a button 46 to move up on the diagnostics display menu, a button 48 to move down on the diagnostics display menu, an emergency brake release switch 50 to momentarily release a parking brake (not shown), and a pump switch 52 to start, run, or switch off a pump on the shuttle car 10. In some embodiments, the park brake release 50 can energize a solenoid to release one or more parking brakes. The control station 30 can also include controls to start up and shut down the shuttle car 10. Although FIG. 4 illustrates the controls 32 arranged in a particular manner, it is to be appreciated that other embodiments may utilize a different arrangement of controls 32. As a further alternative, certain controls illustrated distinctly in FIG. 4 can be combined into a single button or switch. In the illustrated embodiment, the diagnostics display 34 is disposed at the center of the control station 30, and a video monitor 31 is positioned adjacent each side of the control station 30. Other arrangements of the diagnostics display 34, control station 30, and video monitors 31 may also be used.

Figure 5:
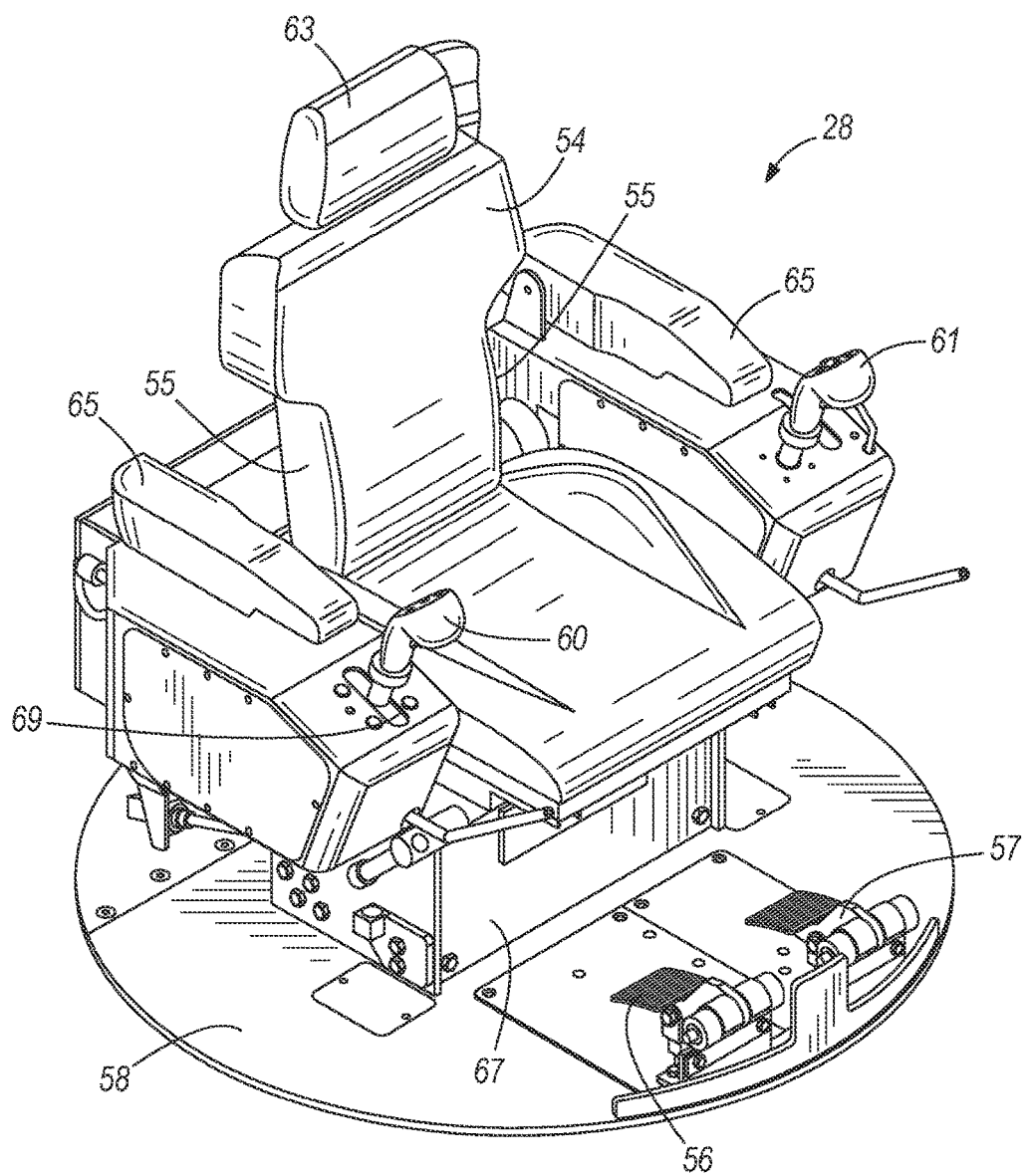
FIG. 5 is a perspective view of an operator's seat module from the operator's compartment of FIGS. 1-3.
Figure 6:
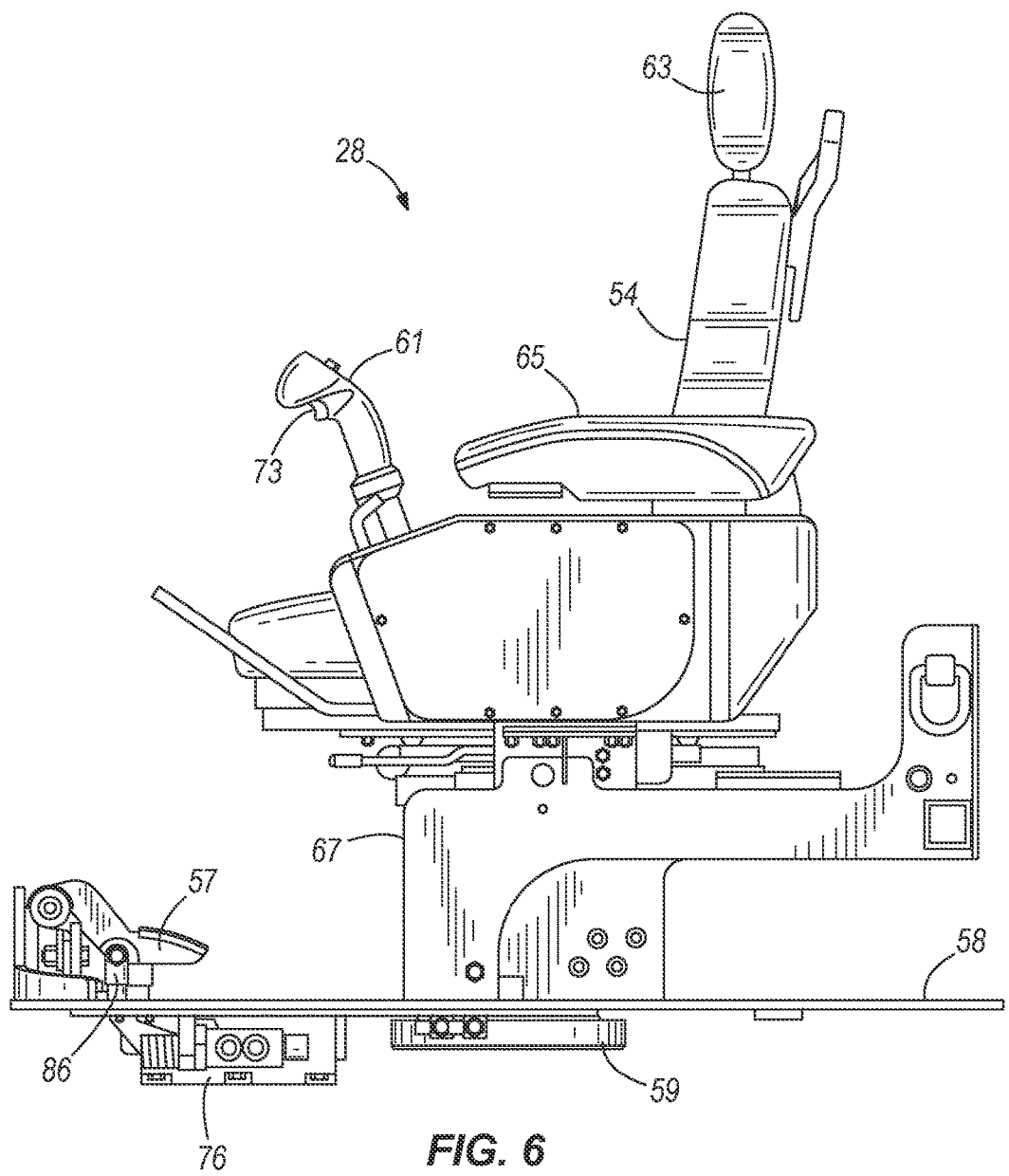
FIG. 6 is a side view of the operator's seat module of FIG. 5.

Referring also to FIGS. 5 and 6, the operator's seat module 28 includes an operator's seat 54 and a pair of foot-pedal controls 56, 57. In the illustrated construction, the left-side foot-pedal control 57 operates the brake, and the right-side foot-pedal control 56 operates the drive system for tramming the shuttle car 10 in the direction of either the loading end 17 or the discharge end 19. In this regard the pedals 56, 57 are arranged in the traditional "gas is on the right, brake is on the left" configuration. Both the operator's seat 54 and foot-pedal controls 56, 57 are mounted on a rotatable platform 58 so as to be rotatable as a unit within the operator's compartment 12. Rotating the seat module 28 can be accomplished by means of mechanical, hydraulic, pneumatic, or electric systems depending upon the capabilities and configuration of the shuttle car to which the operator's compartment 12 is attached. In the illustrated embodiment, a drum 59 (see FIG. 6) is positioned below the platform 58 and can be rotated by, for example, hydraulic, pneumatic, or electrical motors (not shown) drivingly coupled to the drum 59 by belts and pulleys, gear systems, or combinations thereof. Other embodiments may utilize hydraulic cylinders or other linear actuators coupled to an outer portion of the platform 58 that extend and retract to rotate the platform 58. A release mechanism (not shown) may be incorporated to allow manual rotation of the platform 58 when power is not available or if there is a malfunction in any of the components that provide automated rotation of the platform 58.

In some embodiments, the platform 58 can rotate through a total of about 120 degrees so that the operator can position the seat 54 generally in either direction of travel. For example, in the illustrated embodiment, when centered the platform 58 and operator's seat 54 are positioned at a substantially right angle with respect to the conveyor system 18. The platform 58 and operator's seat 54 can then be rotated approximately 60 degrees to either side as desired by the operator. Other rotational positions are possible depending on the usage requirements or preferences for the particular shuttle car 10 or particular operator. In some constructions, there are a substantially infinite number of rotational positions in which the seat 54 can be secured.

In some embodiments, the operator's seat 54 can include cutouts 55 that accommodate a self-rescuer or battery pack (generally worn by the operator), an adjustable headrest 63, an adjustable seat back, a seat belt, and armrests 65. Right and left side joysticks 60, 61 for controlling the shuttle car 10 and the platform 58 are positioned proximate the ends of respective armrests 65. A seat base 67 is coupled to the platform 58 and supports the seat 54. The seat base 67 includes slides, linkages, guides, and the like that allow the operator to adjust the height and distance of the seat 54 relative to the foot-pedal controls 56, 57. The seat base 67 may also be configured to adjust the relative position of the seat 54 with respect to the arm rests 65.

Figure 7:
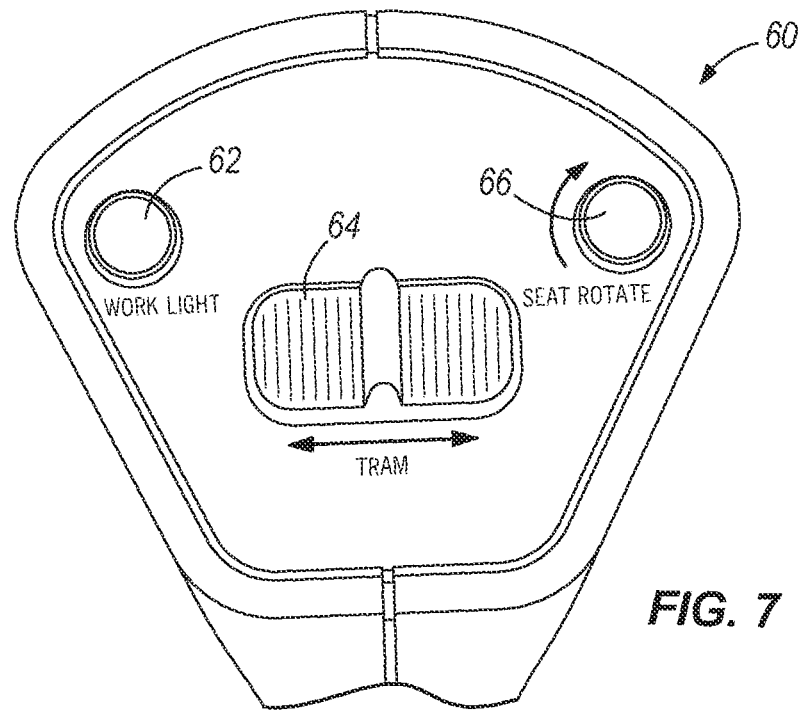
FIG. 7 is a plan view of a left joystick of the operator's seat module of FIGS. 5 and 6.
Figure 8:
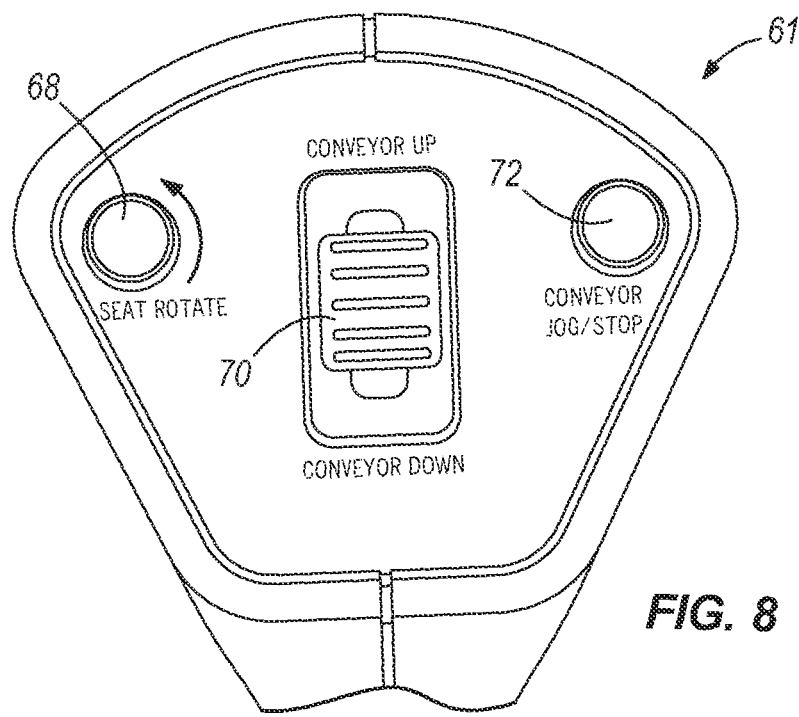
FIG. 8 is a plan view of a right joystick of the operator's seat module of FIGS. 5 and 6.

Referring also to FIGS. 7 and 8, the right and left joysticks 60, 61 include controls in the form of buttons and switches for operating the shuttle car 10 and the platform 58. In some embodiments, the right-hand joystick 60 can include one or more of the following: a button 62 to actuate the flash or horn, a tram-direction switch 64 for setting the tram direction of the shuttle car 10, and a button 66 for rotating the platform 58 to the right (e.g., clockwise when viewed from above). Moreover, in the illustrated embodiment, the right-hand joystick 60 is moveable fore and aft in an elongated slot 69 (see FIG. 5) for steering the shuttle car 10, as discussed below. In the illustrated construction, the tram-direction switch 64 is a rocker-type switch having right and left portions, one of which is depressed and thus "active" or "on" at any point in time. Other types of switches may also be used to select the direction in which the car 10 will travel.

The left-hand joystick 61 can include a button 68 for rotating the platform 58 to the left (e.g., counterclockwise when viewed from above), a switch 70 for raising or lowering the conveyor system 18, and a button 72 to load or discharge the conveyor 18. In some embodiments, the right and left joysticks 60, 61 also each include a trigger 71, 73 (see FIG. 6 for trigger 73 on the left joystick 61). To reduce the potential for unwanted rotation of the platform 58, for example, when an operator is entering or exiting the operator's compartment, rotation of the platform 58 to the right may require the simultaneous pulling of the left joystick 61 trigger 73 and pressing of the right joystick 60 button 66. Similarly, rotation of the platform 58 to the left may require simultaneous pulling of the right joystick 60 trigger 71 and pressing of the left joystick 61 button 68. Generally speaking, when the operator is not in the process of rotating the seat 54 between various angular positions, the seat 54 is secured against rotation. Although FIGS. 7 and 8 illustrate the joystick controls arranged in a particular manner, it is to be appreciated that other embodiments may include a different arrangement of controls.

Figure 9:
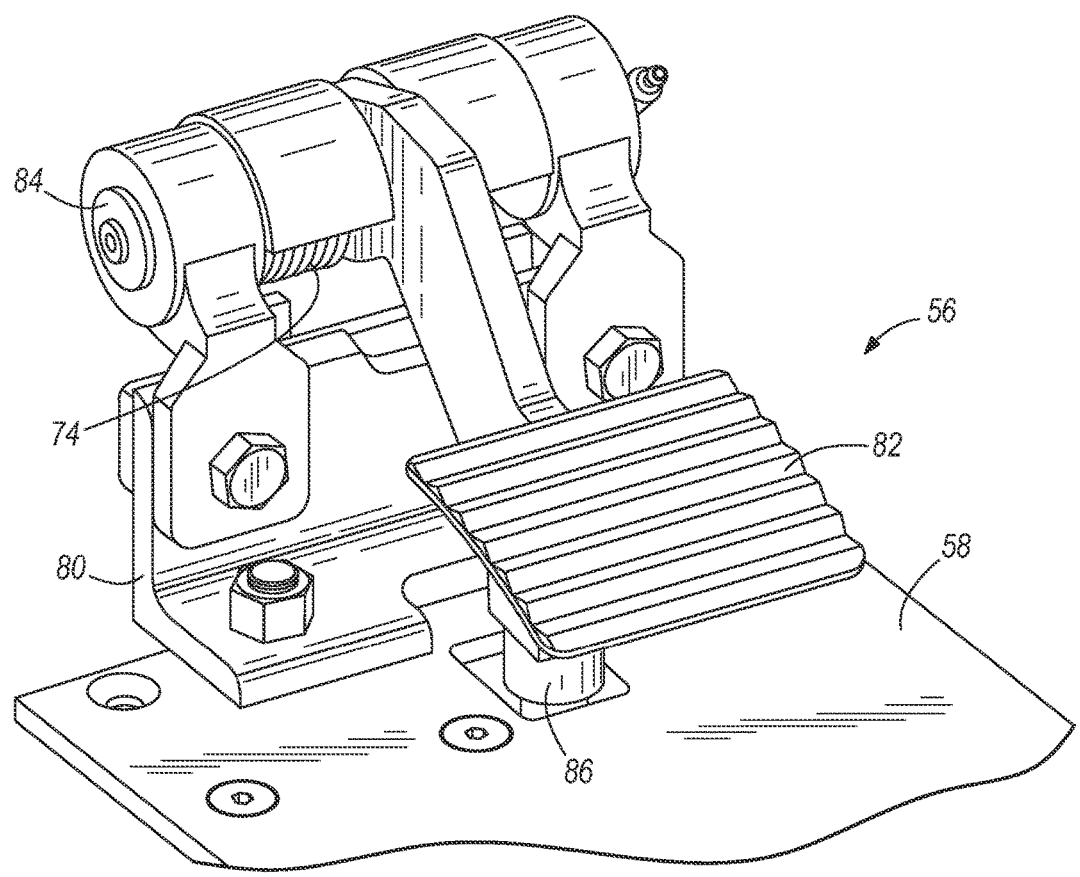
FIG. 9 is a perspective view of a foot-pedal control of the operator's seat module of FIGS. 5 and 6.

FIG. 9 illustrates the right-side foot-pedal control 56, the left-side foot-pedal control 57 being substantially the same. The foot-pedal control 56 includes a bracket assembly 80 coupled to the platform 58 and a pedal 82 pivotally coupled to the bracket assembly 80 by a pin 84. A torsion spring 74 surrounds the pin 84 and biases the pedal 82 generally upwardly. Positioning the torsion spring 74 above the platform 58 allows for easy serviceability. A pushrod 86 extends through an opening in the platform 58 and into a foot-switch enclosure 76, which can include sensors, solenoids, and the like for actuating the drive mechanism of the shuttle car 10 in response to operation of the pedal 82.

The right joystick 60 is used to steer or turn the shuttle car 10 in a manner intended to be natural and intuitive for the operator. Pushing or pulling the right joystick 60 along the slot 69 between fore, neutral, and aft positions turns the wheels 14 of the shuttle car 10, thus allowing the shuttle car 10 to negotiate corners. Movement of the shuttle car 10 is controlled with a combination of the tram-direction switch 64, which determines the direction in which the shuttle car 10 will travel, and the foot-pedal controls 56, 57 which control the speed at which the shuttle car 10 travels in the direction associated with the position of the tram-direction switch 64. The operation of these controls is independent of the rotational position of the platform 58. As such, regardless of whether the operator is facing at a right angle to the conveyor 18, generally toward the loading end 17, or generally the discharge end 19, steering and movement of the shuttle car 10 is controlled in the same manner. Although not necessary, operators are free to rotate the platform 58 such that they are facing generally in the direction they wish to travel.

Using the shuttle car 10 and operator's compartment 12 configuration in the drawings as an example, to travel in a straight line with the loading end 17 at the "front" of the shuttle car 10, the joystick 60 is positioned in the neutral position and the tram-direction switch 64 is operated to select the loading end 17 as the front of the shuttle car 10. In the illustrated construction, this is accomplished by depressing the right-hand portion of the tram-direction switch 64, which is closest to the loading end 17 (see FIGS. 1 and 7). The operator may then depress the right-foot pedal 56, thus activating the drive mechanism of the shuttle car 10 and moving the shuttle car 10 in the direction of the loading end 17. To travel in the opposite direction (e.g., with the discharge end 19 as the "front" of the shuttle car 10), the operator can flip the tram-direction switch 64 such that the left portion of the switch is depressed, and depress the right-foot pedal 56, thus activating the drive mechanism of the shuttle car 10 and moving the shuttle car in the direction of the discharge end 19. Although the joysticks 60, 61 and foot-pedal controls 56, 57 are arranged in a particular manner in some embodiments, it is to be appreciated that, in other embodiments, the arrangement can be different depending on the usage requirements or preferences for the particular shuttle car 10.

With reference to FIGS. 10-13, the right-hand joystick 60 can offer an intuitive control for steering the shuttle car 10. In the illustrated embodiments, by pulling the right-hand joystick 60 rearwardly and toward the seat/operator, the operator can steer the shuttle car 10 toward the same side of the underground roadway as the operator is positioned, regardless of which direction the shuttle car 10 is traveling. Similarly, by pushing the right-hand joystick 60 forwardly and away from the seat/operator, the operator can steer the shuttle car 10 toward the side of the underground roadway opposite the operator's position.

Figure 10:
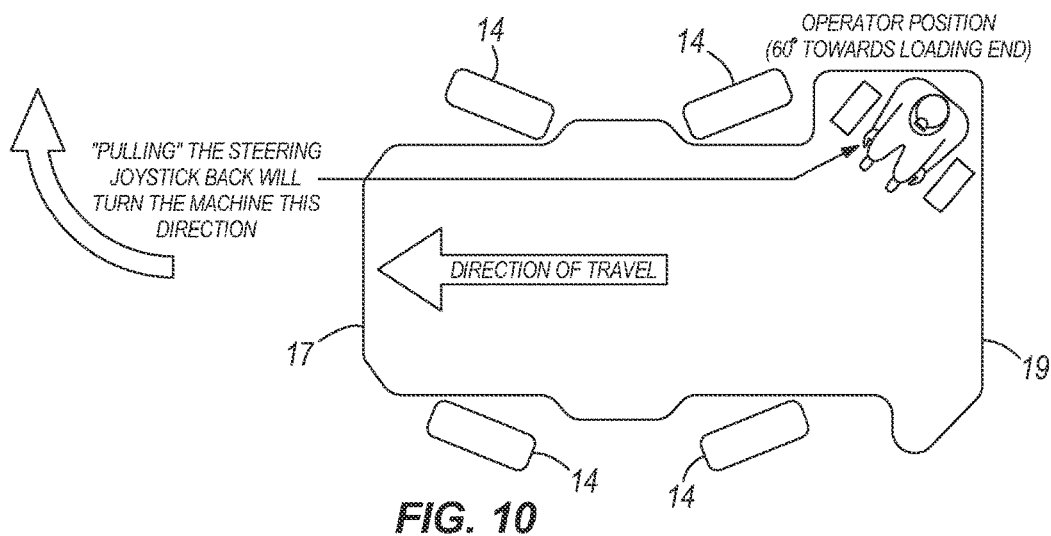
FIG. 10 is a schematic representation of an operator executing a right turn when the shuttle car is traveling in the direction of its loading end.

For example, as shown in FIG. 10, when the shuttle car 10 travels in the direction of the loading end 17, the operator can pull the right-hand joystick 60 rearwardly to steer the shuttle car 10 to the right. More specifically, in the illustrated construction having the cab 12 disposed in the illustrated location near the discharge end 19, the operator can flip the tram-direction switch 64 on the right-hand joystick 60 to the right, pull the right-hand joystick 60 rearwardly, and depress the right-foot pedal 56 to travel in the direction of the loading end 17 while executing a turn to the right.

Figure 11:
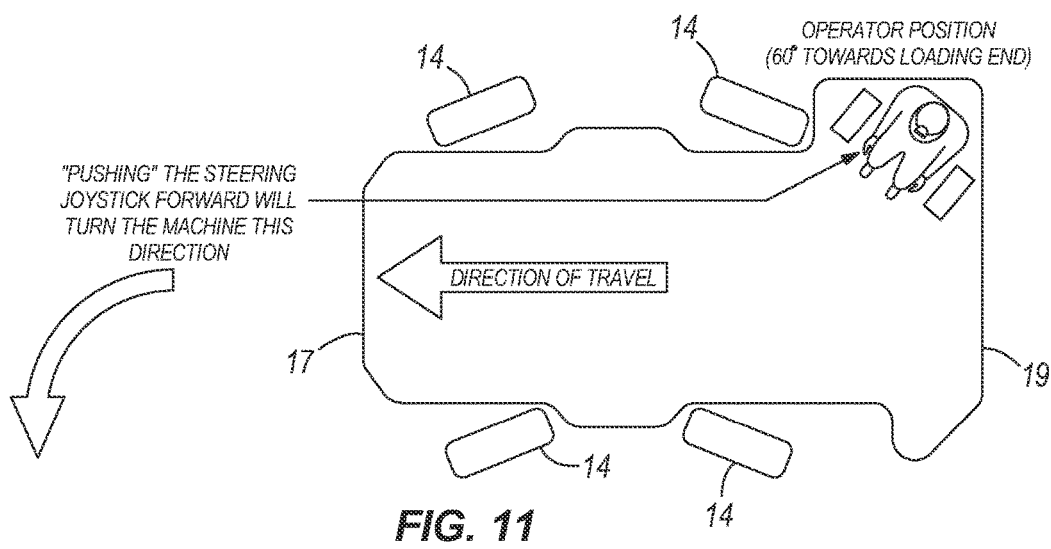
FIG. 11 is a schematic representation of an operator executing a left turn when the shuttle car is traveling in the direction of its loading end.

As shown in FIG. 11, when the shuttle car 10 travels in the direction of the loading end 17, the operator can push the right-hand joystick 60 forwardly to steer the shuttle 10 to the left. More specifically, in the illustrated construction having the cab 12 disposed in the illustrated location near the discharge end 19, the operator can flip the tram-direction switch 64 to the right, push the right-hand joystick 60 forwardly, and depress the right-foot pedal 56 to travel in the direction of the loading end 17 while executing a turn to the left.

Figure 12:
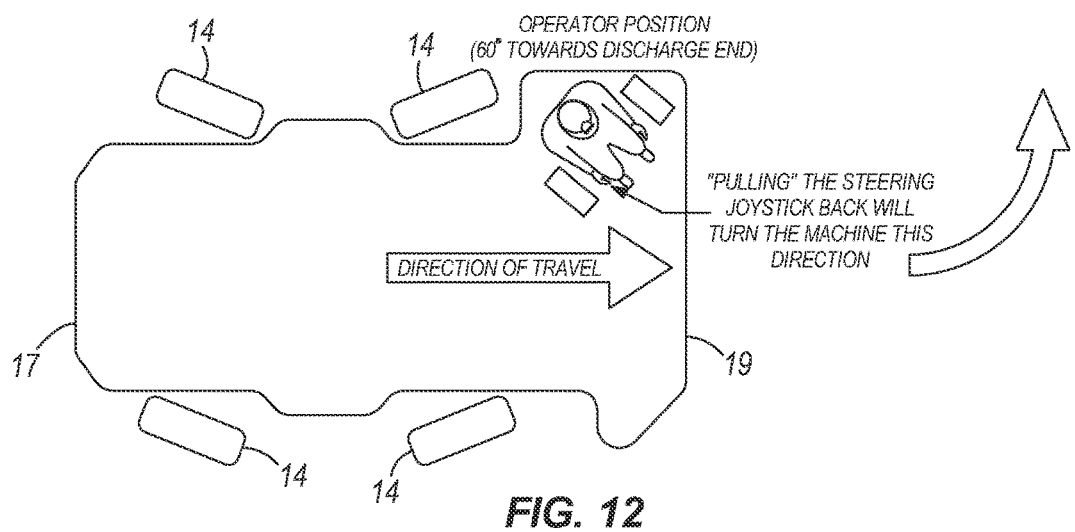
FIG. 12 is a schematic representation of an operator executing a left turn when the shuttle car is traveling in the direction of its discharge end.

As shown in FIG. 12, when the shuttle car 10 travels in the direction of the discharge end 19, the operator can push the right-hand joystick 60 forwardly to steer the shuttle car 10 to the right. More specifically, in the illustrated construction having the cab 12 disposed in the illustrated location near the discharge end 19, the operator can flip the tram-direction switch 64 to the left, push the right-hand joystick 60 forwardly, and depress the right-foot pedal 56 to travel in the direction of the discharge end 19 while executing a turn to the right.

Figure 13:
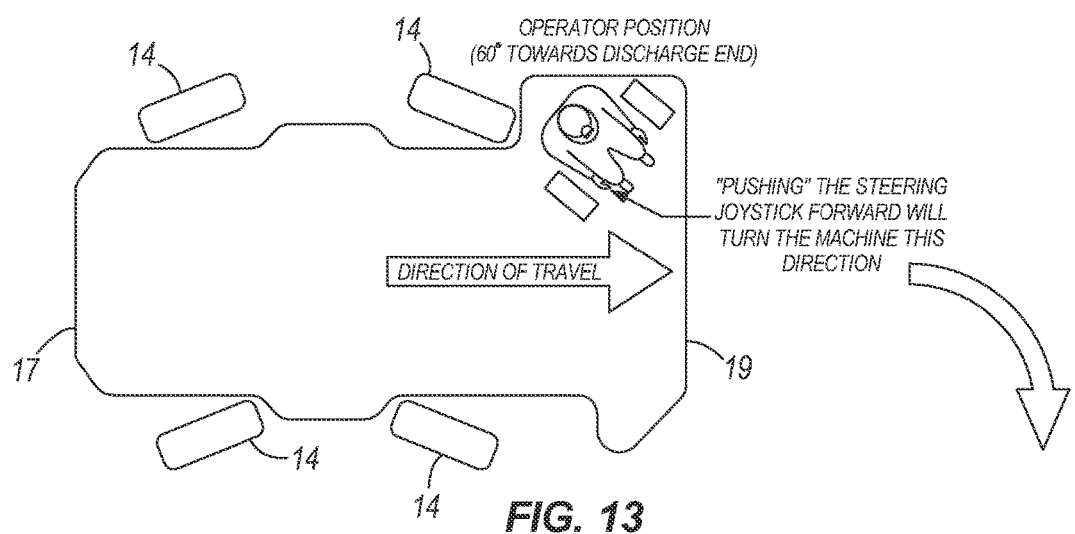
FIG. 13 is a schematic representation of an operator executing a right turn when the shuttle car is traveling in the direction of its discharge end.

As shown in FIG. 13, when the shuttle car 10 travels in the direction of the discharge end 19, the operator can pull the right-hand joystick 60 rearwardly to steer the shuttle car to the left. More specifically, in the illustrated construction having the cab 12 disposed in the illustrated location near the discharge end 19, the operator can flip the tram-direction switch 64 to the left, pull the right-hand joystick 60 rearwardly, and depress the right-foot pedal 56. Again, by pulling the right-hand joystick 60 toward the operator, the operator can steer the shuttle car 10 to the same side of the underground roadway as the operator is positioned, and by pushing the right-hand joystick 60 away from the operator, the operator can steer the car 10 to the side of the underground roadway opposite the operator's position.

The above-described method of steering the shuttle car 10 can be intuitive to the operator, because by pulling the joystick 60 toward the operator, the operator can steer the car 10 to the same side of the underground roadway as to where the cab 12 is disposed, regardless of the direction the operator is facing or tramming. Similarly, by pushing the joystick 60 away from the operator, the operator can steer the car 10 to the side of the underground roadway opposite to where the cab 12 is disposed, regardless of the direction the operator is facing or tramming. Stated slightly differently, when the operator pulls on the joystick 60, the shuttle car 10 turns generally about a point that is behind the operator, such that, in the illustrated construction, the cab is positioned to the inside of the resulting turn, and when the operator pushes on the joystick 60, the shuttle car 10 turns generally about a point that is in front of the operator, such that, in the illustrated construction, the cab is positioned to the outside of the resulting turn, regardless of the direction in which the shuttle car is traveling.

What is claimed is:

1. A seat module for a mining shuttle car that includes a loading end, a discharge end, and a conveyor extending between the loading end and the discharge end, the seat module comprising:
   an enclosure;
   a rotatable platform positioned within the enclosure; and
   a seat supported by the rotatable platform and rotatable therewith between a first secured position facing generally toward the loading end, a second secured position facing generally toward the discharge end, and at least one secured position between the first and second positions, wherein the seat is freely rotatable during operation of the mining shuttle car, and wherein operation of the mining shuttle car is independent of the position of the seat.

2. The seat module of claim 1, wherein the seat is rotatable with the rotatable platform between any one of a plurality of positions between the first and second positions.

3. The seat module of claim 1, further comprising foot controls supported by the rotatable platform and rotatable therewith.

4. The seat module of claim 1, further comprising a joystick control supported by the rotatable platform and rotatable therewith, the joystick control operable to steer the mining shuttle car.

5. The seat module of claim 4, wherein the joystick control is moveable forwardly and rearwardly relative to the seat to steer the mining shuttle car.

6. The seat module of claim 4, wherein forward movement of the joystick control relative to the seat steers the shuttle car about a point in front of the seat, and rearward movement of the joystick control relative to the seat steers the shuttle car about a point behind the seat, regardless of the rotational position of the seat.

7. The seat module of claim 4, wherein the joystick control includes a switch for setting a tramming direction of the mining shuttle car.

8. The seat module of claim 1, further comprising a first joystick control and a second joystick control each supported by the rotatable platform and rotatable therewith, the first joystick control operable to steer the mining shuttle car and including a switch for setting a tramming direction of the mining shuttle car, and the second joystick control including at least one control for operating the conveyor.

9. The seat module of claim 1, wherein the seat is freely rotatable independent of tramming of the mining shuttle car.

10. A mining shuttle car comprising:
    a loading end;
    a discharge end;
    a conveyor system extending between the loading end and the discharge end; and
    a seat module positioned adjacent the conveyor system and including a rotatable seat, the seat being rotatable between a first secured position facing generally toward the loading end, a second secured position facing generally toward the discharge end, and at least one secured position between the first and second positions, wherein the seat is freely rotatable during operation of the mining shuttle car, and wherein operation of the mining shuttle car is independent of the position of the seat.

11. The mining shuttle car of claim 10, further comprising foot controls coupled to the seat and rotatable therewith.

12. The mining shuttle car of claim 10, further comprising a joystick control coupled to the seat and rotatable therewith, the joystick control operable to steer the mining shuttle car.

13. The mining shuttle car of claim 12, wherein the joystick control is moveable forwardly and rearwardly relative to the seat to steer the mining shuttle car.

14. The mining shuttle car of claim 12, wherein forward movement of the joystick control relative to the seat steers the shuttle car about a point in front of the seat, and rearward movement of the joystick control relative to the seat steers the shuttle car about a point behind the seat, regardless of the rotational position of the seat.

15. The mining shuttle car of claim 12, wherein the seat module is disposed to one side of the mining shuttle car, and wherein pulling the joystick toward the seat while tramming steers the mining shuttle car such that the seat module is positioned to the inside of the resulting turn, and wherein pushing the joystick away from the seat while tramming steers the mining shuttle car such that the seat module is positioned to the outside of the resulting turn.

16. The mining shuttle car of claim 10, further comprising a foot control rotatable with the seat.

17. The seat module of claim 10, wherein the seat is freely rotatable independent of tramming of the mining shuttle car.

* * * * *